(12) United States Patent
Blankenship

(10) Patent No.: US 8,561,471 B2
(45) Date of Patent: Oct. 22, 2013

(54) CAPACITIVE PRESSURE SENSOR WITH IMPROVED ELECTRODE STRUCTURE

(75) Inventor: Steven D. Blankenship, Melrose, MA (US)

(73) Assignee: MKS Instruments, Inc., Andover, MA (US)

(*) Notice: Subject to any disclaimer, the term of this patent is extended or adjusted under 35 U.S.C. 154(b) by 155 days.

(21) Appl. No.: 13/248,521

(22) Filed: Sep. 29, 2011

(65) Prior Publication Data

US 2012/0118067 A1    May 17, 2012

Related U.S. Application Data

(63) Continuation-in-part of application No. 13/018,941, filed on Feb. 1, 2011, now Pat. No. 8,333,118.

(60) Provisional application No. 61/300,620, filed on Feb. 2, 2010.

(51) Int. Cl.
    *G01L 9/12*    (2006.01)

(52) U.S. Cl.
    USPC ............................................. 73/724; 73/718

(58) Field of Classification Search
    USPC .................................. 73/700–756
    See application file for complete search history.

(56) References Cited

U.S. PATENT DOCUMENTS

| | | | |
|---|---|---|---|
| 3,195,028 A | 7/1965 | Werner et al. | |
| 4,380,932 A | 4/1983 | Mott et al. | |
| 4,466,289 A | 8/1984 | Lam | |
| 4,785,669 A | 11/1988 | Benson et al. | |
| 4,823,603 A * | 4/1989 | Ferran et al. | 73/724 |
| 5,035,145 A * | 7/1991 | Spencer et al. | 73/744 |
| 5,396,803 A * | 3/1995 | Ferran | 73/724 |
| 6,105,436 A | 8/2000 | Lischer et al. | |
| 6,901,808 B1 | 6/2005 | Sharpless et al. | |
| 7,383,737 B1 | 6/2008 | Lin et al. | |
| 2008/0255787 A1 * | 10/2008 | Sullivan et al. | 702/87 |
| 2009/0255342 A1 | 10/2009 | Grudzien | |
| 2012/0001648 A1 * | 1/2012 | Grudzien | 324/686 |
| 2012/0031190 A1 * | 2/2012 | Blankenship | 73/753 |

OTHER PUBLICATIONS

International Search Report and the Written Opinion dated Mar. 18, 2013 from Corresponding PCT Application No. PCT/US2012/057797.

* cited by examiner

*Primary Examiner* — Andre Allen
(74) *Attorney, Agent, or Firm* — McDermott Will & Emery LLP

(57) ABSTRACT

An improved capacitive manometer comprises a diaphragm that is constrained relative to an electrode structure spaced from the diaphragm. An electrode support structure is arranged to support the electrode structure and comprises a compliant ring including at least three flexures integrally formed in the ring and angularly spaced around the alignment axis. The electrode support is clamped in place relative to the diaphragm at the locations of the compliant ring flexures.

9 Claims, 9 Drawing Sheets

CAPACITIVE PRESSURE SENSOR WITH IMPROVED ELECTRODE STRUCTURE

CROSS-REFERENCE TO RELATED APPLICATION

This application is a continuation-in-part of U.S. patent application Ser. No. 13/018,941 filed Feb. 1, 2011 in the name of Steven D. Blankenship and entitled Capacitive Pressure Sensor; which application in turn is based upon and claims priority to U.S. provisional patent application 61/300,620, entitled "Capacitive Pressure Sensor," filed on Feb. 2, 2010 in the name of Steven D. Blankenship, and assigned to the present assignee, the foregoing applications being incorporated by reference in their entirety.

BACKGROUND

This disclosure relates generally to a capacitive pressure sensor, and more particularly to an improved sensor providing very precise and accurate measurements of pressure, particularly at very low (vacuum) pressures.

Pressure transducers have been employed in a myriad of applications. One such transducer is the capacitive manometer which provides very precise and accurate measurements of pressure of a gas, vapor or other fluid. Applications include precision control of vacuum based processes and semiconductor process control. Examples include semiconductor etch process and physical vapor deposition.

Capacitive manometers typically use (a) a flexible diaphragm forming or including an electrode structure and (b) a fixed electrode structure spaced from the diaphragm so as to establish capacitance there between. Variations in pressure on one side of the diaphragm relative to the pressure on the opposite side of the diaphragm causes the diaphragm to flex so that the capacitance between the electrode structure of the diaphragm and the fixed electrode structure varies as a function of this differential pressure. Usually, the gas or vapor on one side of the diaphragm is at the pressure being measured (Px), while the gas or vapor on the opposite side of the diaphragm is at a known reference pressure (Pr), the latter being at atmosphere or some fixed high or low (vacuum) pressure, so that the pressure on the measuring side of the diaphragm can be determined as a function of the capacitance measurement.

Many applications requiring extremely low pressures (high vacuum) have been and continue to be developed resulting in the need for capacitive manometers capable of measuring such low pressures. However, increasing the sensitivity of capacitive manometers to provide very precise and accurate pressure measurements at low pressures poses several design challenges. In order to measure extremely low pressures (high vacuum), capacitive manometers require very narrow gaps between the flexible diaphragm and the fixed electrode structure so that they can detect small changes in pressure.

A drawback to using very narrow gaps is that smaller changes in the shape of the electrode gap unrelated to the measurement of differential pressure across the diaphragm are also detected. One of these detrimental changes to the electrode gap shape is a change in the electrode gap spacing. Although it is common practice in the industry to reduce the effect of change in the electrode gap spacing by using the dual electrode design approach, good control over the electrode gap spacing provides further enhanced stability of the sensor output. This is especially important when one measures extremely low pressures (extremely small diaphragm deflections) enabled by the use of narrow electrode gaps.

Capacitance measurements are based on the well known equation for parallel plate capacitance C:

$$C = e_r e_o A/s,$$

where C is the capacitance between two parallel plates,
$e_o$ is the permittivity of free space,
$e_r$ is the relative permittivity of the material between the plates (for vacuum, $e_r = 1$),
A is the common area between the plates, and
s is the spacing between the plates.

Based on this equation, one can derive the relationship that the fractional change in capacitance is equal to the negative of the fractional change in electrode gap spacing for each measuring electrode ($\Delta C/C = -\Delta S/S$).

It can then be readily seen that it is critical to maintain good control over the electrode gap spacing in order to provide stable control over the capacitance of each measuring electrode. In a simple dual electrode design, these effects are balanced to a first order at zero differential pressure for a flat diaphragm and electrode structure (each having different real values of flatness and inclination deviation from true plane) for a given electrical measurement technique such as with any number of commonly used bridge designs and other electrical measuring methods. Since, the sensor is configured to measure extremely low pressures (extremely small diaphragm deflections), just balancing the electrodes without making a stable electrode gap is not enough to reduce the uncertainty of the pressure measurement to adequately low levels in order to accomplish stable detection of the smallest pressures.

As the capacitive measurements are designed to detect changes in displacement between the fixed electrode structure and the diaphragm pressure resisting element, one source of error relates to any changes in the shape and position of the fixed electrode structure which produce changes in the sensor output that are unrelated to pressure.

In order to maintain good accuracy of the pressure measurement system, it is necessary to control critical aspects of the sensor geometry that may contribute to changes in sensor capacitance levels within the scope of the desired system accuracy.

Along the lines of repeatability and stability, for prior art capacitive pressure sensors of the clamped electrode support type, where no allowance has been made for the effects of differential expansion and lack of radial compliance between the electrode support and sensor housing, any slip occurring between these components under the action of temperature changes and sometimes ambient pressure changes is the result of large, built up shear forces that are subsequently released when they exceed the frictional binding forces in any of the clamped joints. The changes in these non-conservative forces result in mechanical hysteresis such that the relative lateral positions of the mating components generally do not repeat and cannot be predicted and compensated.

Some exemplary capacitance pressure sensor constructions are described in U.S. Pat. No. 6,105,436. These devices utilize either independent or integral "compliant rings" to relieve or reduce any mechanical strain from being developed between the electrode disk assembly and the sensor housing.

The aforementioned "integral" compliant ring does an effective job of providing good registration between the electrode disk and the diaphragm, and reducing mechanical strain in the electrode structures; but it is still limited by the lowest practical radial spring constant that can be attained by just simply reducing its thickness.

There is a need for a capacitive pressure sensor capable of improved electrode gap shape control at low pressure measurements so as to improve the measurement capabilities of the manometer at these lower pressures.

Reference is made to U.S. Pat. Nos. 7,757,563; 7,706,995; 7,624,643; 7,451,654; 7,389,697; 7,316,163; 7,284,439; 7,201,057; 7,155,803; 7,137,301; 7,000,479; 6,993,973; 6,909,975; 6,735,845; 6,672,171; 6,568,274; 6,105,436; 6,029,525; 5,965,821; 5,942,692; 5,932,332; 5,911,162; 5,808,206; 5,625,152; 5,271,277; 4,823,603; 4,785,669 and 4,499,773; and U.S. Patent Published Application Nos. 20090255342; 20070023140; 20060070447; 20060000289; 20050262946; 20040211262; 20040099061; all assigned to the present assignee.

SUMMARY

In accordance with one aspect of the improved capacitive manometer, the manometer comprises:

(a) a diaphragm including a common electrode and (b) an electrode structure including a center electrode and ring electrode, wherein the diaphragm is movable relative to the electrode structure between (i) a zero position when the pressure on each side of the diaphragm is the same and (ii) a maximum differential position when the maximum measurable differential pressure is applied to the diaphragm, and a diaphragm support structure arranged so as to support the diaphragm so that the diaphragm is constrained relative to the electrode structure, and the common electrode is spaced from and axially aligned with the center and ring electrodes relative to an alignment axis of the manometer; and an electrode support structure arranged to support the electrode structure and comprising a compliant ring including at least three flexures integrally formed in the ring and angularly spaced around the alignment axis;

wherein the fixed electrode structure is axially clamped in place relative to the diaphragm, at the locations of the compliant ring flexures, thus forming the active measuring capacitances.

These, as well as other components, steps, features, objects, benefits, and advantages, will now become clear from a review of the following detailed description of illustrative embodiments, the accompanying drawings, and the claims.

Figure 1:
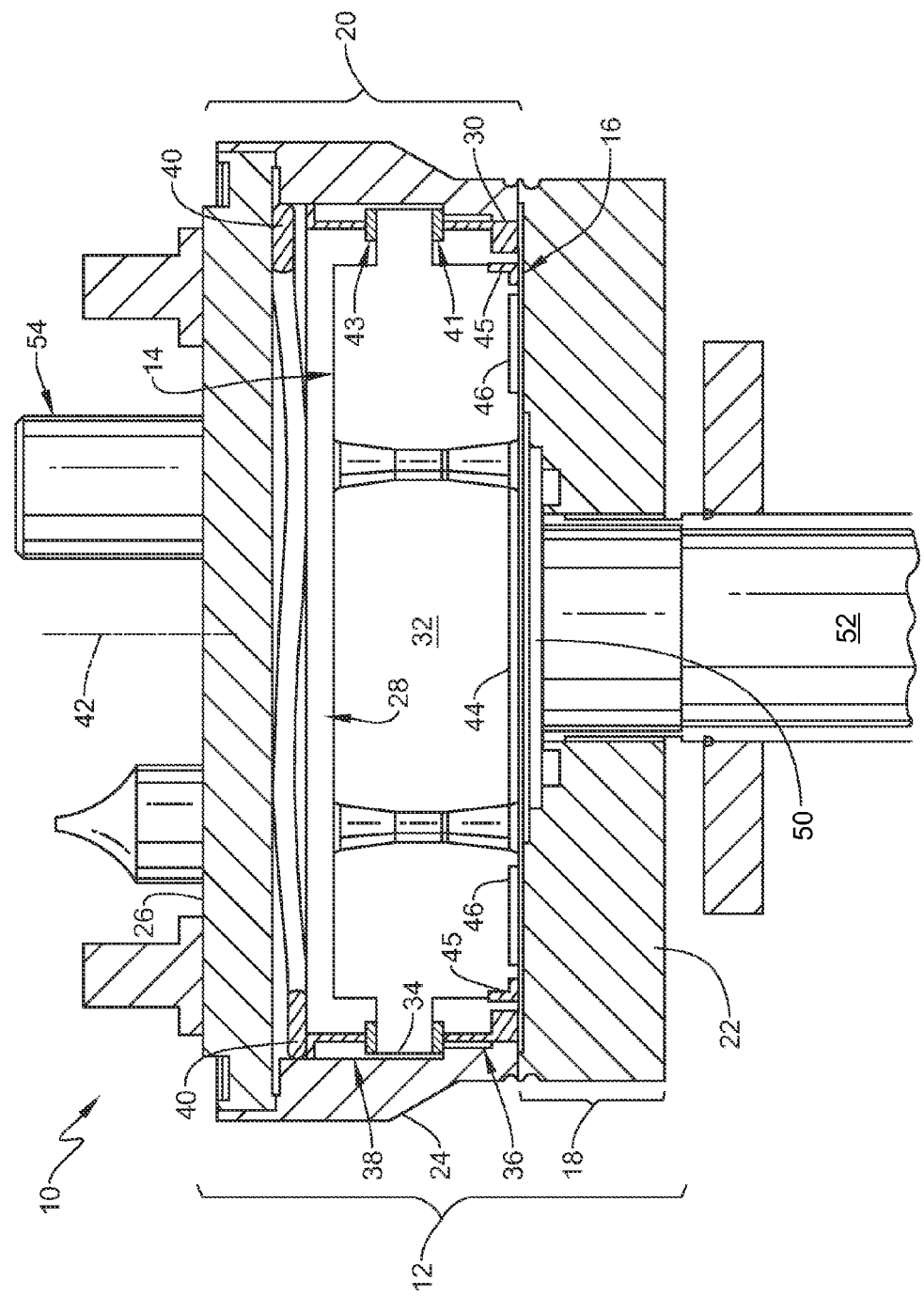
FIG. 1 is a cross sectional view of one embodiment of a sensor, along the axis of a sensor, incorporating the improvements described herein.

The drawings disclose illustrative embodiments. They do not set forth all embodiments. Other embodiments may be used in addition or instead. Details which may be apparent or unnecessary may be omitted to save space or for more effective illustration. Conversely, some embodiments may be practiced without all of the details which are disclosed. When the same numeral appears in different drawings, it refers to the same or like components or steps.

DETAILED DESCRIPTION OF ILLUSTRATIVE EMBODIMENTS

Illustrative embodiments are now discussed. Other embodiments may be used in addition or instead. Details which may be apparent or unnecessary may be omitted to save space or for a more effective presentation. Conversely, some embodiments may be practiced without all of the details which are disclosed.

In accordance with one aspect of the present invention a series of slots are introduced into the integral style of compliant ring so as to eliminate the hoop stress, creating a series of independent flexures which allow for a reduction in the radial spring constant at the electrode disk supports without having to further reduce (radial) thickness. This effectively reduces the radial spring constant and maximum possible radial shear loads between the electrode disk and sensor housing while still maintaining a practical usable thickness of this element.

In order to accurately measure the lowest pressures, improved control is needed over the critical sensor geometry. Reducing the maximum possible change in shape of the electrode structure against temperature and barometric pressure is accomplished with the improvements described herein. These environmental effects all contribute to radial shear loading between the electrode disk and the sensor housing.

Since the electrode disk is typically a ceramic material and the sensor housing is typically metallic, differences in their coefficient of thermal expansion cause them to expand and contract at different rates as temperature changes. Even for materials with closely matched thermal expansion coefficients, temperature gradients can still cause differential expansion between the electrode disk and sensor housing.

The differential pressure between ambient pressure and the sensor operating pressures causes mechanical loads and deformation in the sensor housing, some of which are transmitted to the internal assembly albeit significantly attenuated in terms of local dimensional changes in the measuring electrode structure, these loads are capable of inducing small levels of mechanical strain and deformation in the electrode structure that are observable in low range sensor output unless some form of reduction or isolation is introduced In accordance with one aspect of the improvements described herein a structure is provided that enhances the reduction in mechanical strain and shear forces which would otherwise be present in the electrode structure.

By designing the compliant members to operate elastically in response to changes in temperature and ambient pressure, and providing enhanced radial compliance with reduced radial spring constant, a wider operating window is achieved against these thermal and mechanical loading effects on the electrode support structure. This accomplishes a reduction in the deformed shape of the electrode structure during system operation so that the precision and stability of the pressure measurement system is enhanced, as well as a reduction of any potential non-conservative changes to the shape of the electrode structure against environmental factors and thus preserves the calibrated system accuracy.

It is critical to reduce the effects of these environmental factors on the maximum possible shear forces developed between the electrode disk and the sensor housing as the changes in these shear forces and subsequent change in shape of the electrode structure are typically not repeatable and cannot be compensated when the shear forces exceed the frictional binding forces between the electrode disk and sensor housing. The compliant ring flexures improvement further reduces these shear forces and provides additional margin against exceeding the frictional binding forces.

In accordance with another aspect of the improvements described herein a reduction in the maximum possible shear loads between the electrode disk and the sensor housing, as well as reduction in any shifts in the sensor output related to these effects is accomplished so that there is a reduction in the magnitude of any mechanical hysteresis due to these non-conservative effects. The maximum possible changes to the shape of the electrode structure are reduced, allowing improved preservation of system accuracy for the lowest pressure ranges having the smallest electrode gaps.

The potential changes in shape of the electrode structure and diaphragm include bending of the electrode disk, transverse Poisson contraction of the electrode disk, changes in the position of the diaphragm boundary in the vicinity of the electrode supports with subsequent changes to the shape of the diaphragm from zero differential pressure to any pressure within the operating pressure range of the instrument.

Since the capacitance measurement is based directly on the magnitude of the gap between the conductors and dielectric of the electrode disk relative to the diaphragm at each and every point in the electrode gap region, any changes to these individual capacitances due to the magnitude and change of shear forces between the electrode disk and the sensor housing are not distinguishable from changes in these capacitances due to changes in pressure. Since the present invention reduces these shear forces, mechanical strain and subsequent changes in the shape of the electrode gap, it accomplishes a more stable measurement of these capacitances and thus provides improved stability and accuracy of the pressure measurement.

Enhancements include increased operating temperature range, improved preservation of calibrated accuracy, and the capability of producing lower range instruments having good accuracy and improved stability of pressure measurements against temperature and barometric pressure, while maintaining a robust over-pressure capability.

Referring to the drawings, capacitance manometer 10 shown in FIG. 1 includes a housing 12 for supporting fixed electrode structure 14 and flexible diaphragm 16. The housing 12 can include process housing section 18 and reference housing section 20, the two housing sections being divided by the flexible diaphragm 16. The process housing section 18 includes Px cover 22. The reference housing section 20 includes a ring 24 and Pr cover 26. In the illustrated embodiment, the ring 24 of the reference housing section 20 includes a hollow cavity 28 for receiving and supporting the fixed electrode structure 14 and flexible diaphragm 16 in a predetermined relationship so that they are maintained in a stable, spaced relationship separated by a predetermined sized gap 30. As shown, the fixed electrode structure 14 includes a substrate 32 made from an electrically insulative material, such as a ceramic material, and formed into a rigid, non-flexible structure. A lip 34 can be provided at the periphery of the substrate 32 for engaging a shoulder of a spacer ring 36 provided in the housing 12, and secured in place with locking ring 38 and a wave spring 40. One or more thin spacers 41 may be used to conveniently set the electrode gap spacing to a predetermined value. In addition, one or more thin spacers 43 may be used to conveniently set the wavespring cavity height to a predetermined value in order to set the clamping force to a predetermined value consistent with the design objectives of overpressure capability and the frictional binding forces necessary to clamp the electrode disk structure in a stable geometric relationship with the common electrode diaphragm 16, housing ring 24 and radially compliant spacer ring 36. In one embodiment the size and shape of the substrate 32 can be such that when positioned between the spacer ring 36 and the locking ring 38, the substrate will be precisely positioned within the housing 12 so that the center of the fixed electrode structure 14 is centered on central axis 42, with adequate radial spacing between the substrate 32 and housing ring 24 and spacer ring 36. This effectively reduces the stray capacitance between the electrodes and the metal housing 24 as well as the change in stray capacitance for a small change in radial position of the electrode disk. The wave spring 40 is designed to contact and exert an axial force on the lip 34 of the fixed electrode structure 14 through the radially flexible, locking ring 38 and thin spacer 43 at least three places, equiangularly spaced in 120° around the axis 42. Similarly, the wave spring 40 is designed to contact and exert a counter force on the Pr cover 26 at least three locations displaced 120° around the axis 42, and 60° from the locations of contact with the lip 34 of the fixed electrode structure 14 when the manometer 10 is completely assembled. The fixed electrode structure 14 also includes a center electrode 44 concentrically positioned relative to the center axis 42, and an outer electrode 46 preferably in the form of a ring concentric with the center electrode 44 and the center axis 42.

Flexible diaphragm 16 is either made of or is provided with a layer or coating of suitable conductive material so as to form a common electrode. Diaphragm 16 is secured to the housing so as create process pressure (Px) chamber 50 on one side of the diaphragm and reference pressure (Pr) chamber which includes gap 30 on the other side of the diaphragm. It should be noted that paths can be provided between the flexible diaphragm and the reference housing section 20 (through, for example, reduced thickness parts of etched spacers) that allow pressure to be equalized between the gap 30 and the rest of the Pr portion of the housing. The diaphragm is secured to the housing so as to seal the process pressure chamber 50 from the gap 30 of the reference pressure chamber so that the two chambers can be maintained at different pressures. The gas or vapor to be measured can be introduced into process chamber 50 through a gas inlet 52, defined in part of the Px cover 22. Under normal operation, capacitance manometer 10, functions as an absolute pressure sensor and the reference cavity 28 (and electrode gap 30) are sealed off under vacuum; and in one embodiment the reference housing section 20 is provided with a non-evaporable getter vacuum pump 54 in order to provide a very low pressure (well below the minimum resolution of the instrument) in the reference cavity 28 and electrode gap 30. This is the absolute vacuum reference against which the process pressure is compared. In this mode the differential pressure across the diaphragm is an absolute pressure measurement. Another possible construction method is to use a second gas inlet in place of getter assembly 54 in reference housing section 20 for introducing a gas at a reference pressure into the reference chamber from a source, or at ambient pressure from the surrounding atmosphere. Thus, reference chamber including gap 30 contains a gas or vapor at a predefined reference pressure. It should be noted that the two chambers can be reversed so the reference pressure chamber functions as the process pressure chamber, and the process pressure chamber functions as the reference pressure chamber, where for example that process gas is inert with respect to the electrode and other materials provided in the chamber including the gap 30.

Center and outer electrodes 44 and 46 are preferably flat electrodes disposed on the surface of the substrate 32 so that the electrodes preferably are of uniform thickness and all lie in the same plane. Suitable electrical leads (not shown) are respectively provided for the center and ring electrodes 44 and 46. In one embodiment the common electrode diaphragm 16 is formed integrally with housing section 20 which is the electrical connection. Another possible construction could be with an electrical lead (not shown) provided for the common electrode of diaphragm 16. In the preferred embodiment, electrical guarding 45 on the substrate 32 is provided for the measuring electrodes in order to control electrode fringe capacitance, minimize stray capacitance to the housing 20 and condition the dual electrode capacitance balance at zero differential pressure. The leads are suitably connected to a capacitance measurement device (not shown).

Diaphragm 16 is preferably secured within the housing so that the plane defined by the common electrode is substantially parallel to the plane of the center and outer electrodes 44 and 46 and electrical guard 45 when the pressure is the same on both sides of the diaphragm, i.e., there is zero differential pressure. When a gas or vapor introduced through inlet 52 into the process pressure chamber 50 is at a different pressure from the reference pressure in reference chamber, the diaphragm will flex and the capacitance between the common electrode of the diaphragm 16 and the center electrode 44 will define one capacitance different from the capacitance between the common electrode of the diaphragm 16 and the outer electrode 46. Electrical guard 45 reduces the parasitic stray capacitance between the electrodes and metal housing by blocking the path for the strays in this region. It should be appreciated that by utilizing a large, uniform gap between the major diameter of the substrate 32 and housing ring 24 as shown in FIG. 1; and by placing an electrical guard 45 at the periphery of the electrode disk as shown in FIG. 1, that any changes in these strays due to potential slight lateral displacements of the electrode disk are a much smaller fraction of the sensor capacitance stroke and thus allow for much more precise measurements of differential pressure without introducing changes in the sensor output that are unrelated to the pressure measurement. The pressure in the process pressure chamber 50 is thus a function of the measured capacitance between the common electrode of the diaphragm 16 and the center electrode 44 and the measured capacitance between the common electrode of the diaphragm 16 and the outer electrode 46.

As such, predefined capacitances are established between the common electrode structure of the diaphragm and each of the center and outer electrodes 44 and 46, such that when the differential pressure on the diaphragm is zero, the structure defines a measurable "base" capacitance. In practice, the base capacitance is the sum of the active capacitance at the electrode gap and the stray capacitance to the housing. In addition, when the diaphragm is exposed to the maximum measurable differential pressure the common electrode structure of the diaphragm will be deflected relative to the electrodes 44 and 46 so as to define the "stroke" of the sensor. One measure of the stroke of the sensor is the "capacitance" stroke which is equal to the difference between the center electrode 44 capacitance to the common electrode of the diaphragm 16 minus the outer electrode 46 capacitance to the common electrode of the diaphragm 16 between the zero differential pressure and full scale differential pressure. The maximum change in the diaphragm deflection from zero differential pressure to the full scale value is the span of the diaphragm.

One of the key parameters that define the range of the sensor is the electrode gap spacing which is equal to the distance between the plane of the common electrode structure of the diaphragm 16 (when in the relaxed zero position) and the plane of center and outer electrodes 44 and 46, indicated at gap 30. For a given sensor construction, the "base" capacitance is established by the electrode gap spacing. Capacitance manometers designed for measuring very low pressures (high vacuum) must be very sensitive to and be capable of measuring very small changes in pressure. As a result the spacing between the plane of the common electrode of the diaphragm 16 and the plane of the center and outer electrodes 44 and 46 must be very small so that small changes in the diaphragm deflection can be detected in response to small changes in the differential pressure.

Making the gap 30 smaller to make the manometer 10 more sensitive for measuring smaller differential pressures increases the sensitivity to changes in the shape of the electrode gap which are unrelated to the measurement of differential pressure across the diaphragm. One of these detrimental changes to the electrode gap shape is a change in the electrode gap spacing. Although it is common practice in the industry to reduce the effect of change in the electrode gap spacing by using the dual electrode design approach, good control over the electrode gap spacing provides further enhanced stability of the sensor output. This is especially important when one measures extremely low pressures enabled by the use of narrow electrode gaps.

With the current need to measure smaller and smaller pressures, current capacitive pressure sensors do not possess the inherent electrode gap shape stability required for stable measurement of extremely low pressures.

The present disclosure describes a capacitive manometer in which the structure of the device provides greater stability between the diaphragm and electrodes allowing for even smaller gaps and measurements of lower differential pressures. In providing such a structure the dimensional stability of the sensor electrode gap is improved, especially the electrode disk registration with respect to the diaphragm under normal operating conditions and especially against external influences such as temperature, barometric pressure, overpressure, mechanical shock and vibration. Key sensor parameters that are addressed with the new structure include electrode gap spacing, electrode tilt and electrode distortion. The improvements provide enhanced capabilities allowing for the transducer (i.e., the sensor and the signal conditioning electronics capable of providing a high level dc output—not shown) to require less electrical gain and exhibit less electrical noise (as a result of less electrical gain) and have better zero stability performance when compared to prior art sensors for measuring comparable full scale pressure ranges. And as mentioned, the sensor is capable of providing lower pressure range instruments with less electrical noise and better overall zero stability performance, including but not limited to reduced barometric pressure sensitivity (at zero and at pressure), reduced temperature coefficients and reduced zero drift.

Prior efforts to achieve a stable, reduced gap between the electrodes and the diaphragm include making the Pr ring housing wall somewhat thinner to in an attempt to bring the electrode disk lip contact with the Pr ring step closer to the diaphragm support. But making the Pr housing wall thinner to bring the step closer to the diaphragm support weakens the sensor housing (Pr ring wall), allows more distortion during the manufacturing process and further weakness the Pr ring step against distortion caused by the forces induced by thermal differential expansion, and by changes in the surface loads on the sensor driven by barometric pressure and any external mechanical loading.

Figure 2:
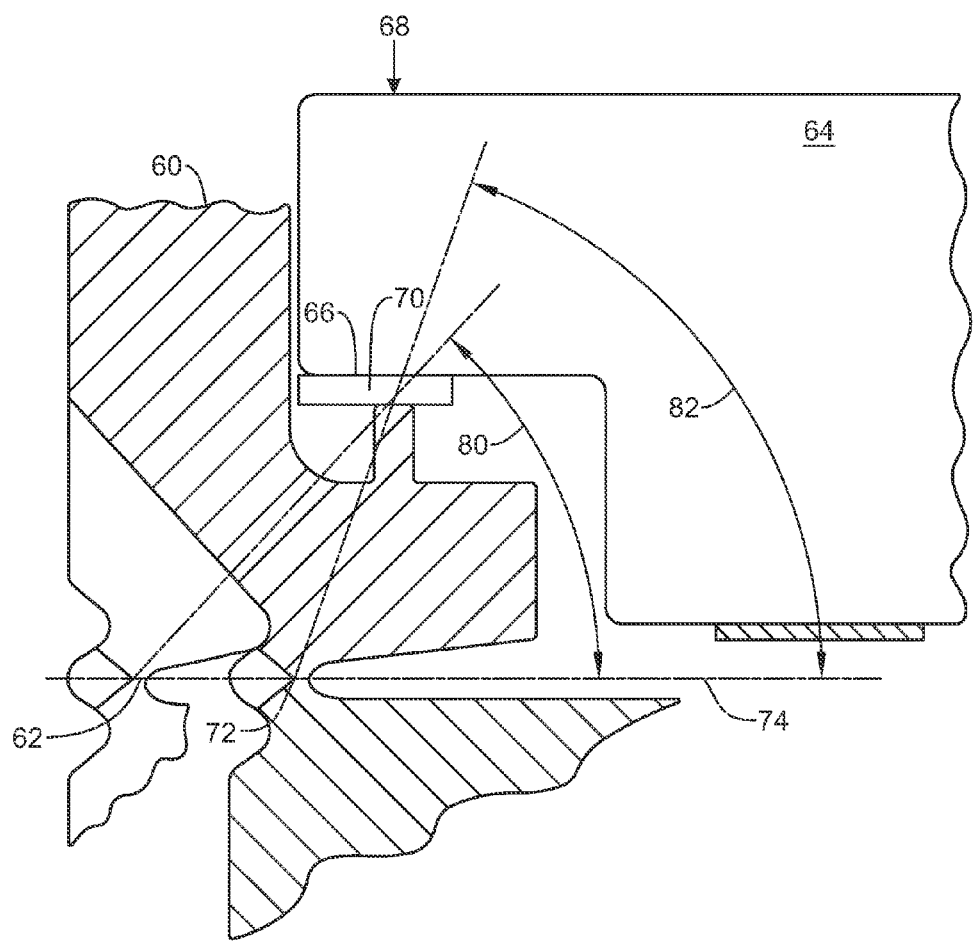
FIG. 2 is a more detailed, cross sectional view of a portion of the embodiment of FIG. 1, showing geometric details of improvement.

In FIG. 2, details of a prior art manometer compared to the new improved manometer are shown. In the prior art, diaphragm 74 is secured to ring 60 around its periphery at a loci of points, one of which is indicated at 62. In a similar manner the fixed electrode structure 64 can be held in place by a annular disk (lock disk) (not shown) applied to the peripheral edge of the electrode structure 64 and held in place by the axial force 68 provided by the wave spring (not shown in FIG. 2) at least three points, one of which is indicated at 70. As seen, the construction defines a solid angle formed between locus point 62 where the diaphragm is attached to the ring 60 and the locus point 70 where the axial force 68 is applied to maintain the electrode structure in place. This angle is shown as 45°. The radial distance from the axis (such as axis 42 in FIG. 1) of the sensor of the loci of points where the diaphragm is attached (such as point 62) is the same, 360° around the axis.

Figure 3:
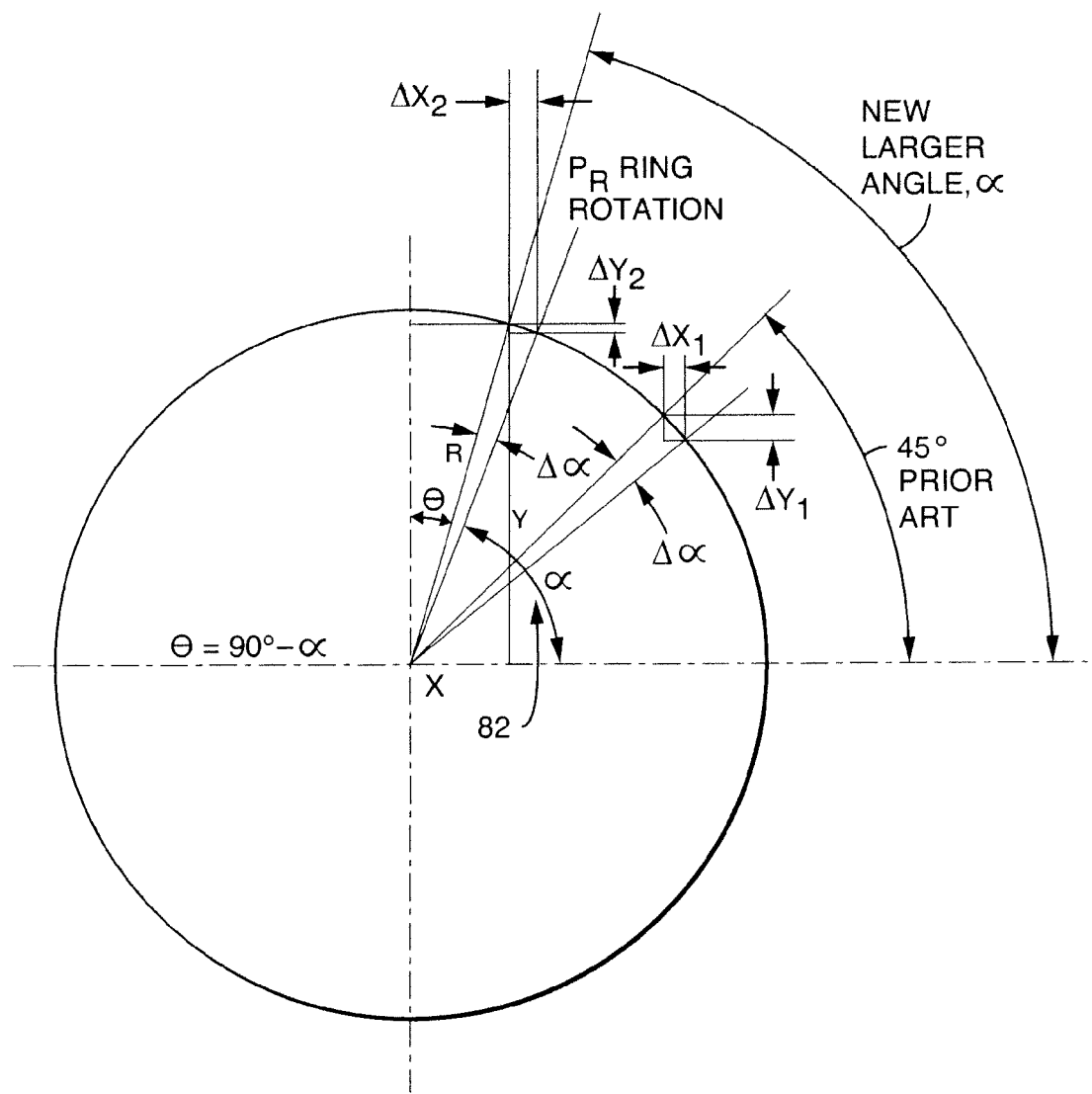
FIG. 3 is a geometric diagram for illustrating some of the geometric features of the FIG. 1 embodiment.

The advantages of the present approach are achieved by constructing and securing the diaphragm and the electrode structure within the manometer so as to place the diaphragm boundary (and support) 72 more directly under the applied clamping load in order to make a more direct support as opposed to a cantilevered (indirect) support. The resulting improved geometry can also be described in more analytic terms by defining the angle α (see FIGS. 2 and 3) of the line drawn from the diaphragm boundary support 72 to the intersection of the Pr housing support for the electrode disk also at the interface 70 between the Pr housing and spacer 66, relative to the plane of the diaphragm 74. The benefits of this geometry are two fold. First and most importantly when changes in barometric pressure or other externally applied loads to the surface of the Px cover occur, the cover bows under this load and the outer diameter of the cover at the diaphragm boundary dilates (increases in size) for a positive pressure against the external surface. This dilation distorts the Pr housing and essentially causes a minute rotation of the lower section of the Pr housing which may be approximated by the change in the angle α at 82 (see FIG. 2). As mentioned above, this angle in at least one prior art manometer is at about 45°. The improved manometer is designed so as to increase this angle to a value with a range of about 60° to 90°. As can be seen in FIG. 3, for small angles, such as in prior art example (about 45°), for a change in this angle, there is a relatively large change $\Delta Y_1$ in the height of the support. For large angles as in one construction of one embodiment of the present design (about 75°) for the same change in the support angle there is a relatively small change $\Delta Y_2$ in the support height for the fixed electrode structure. Reducing this change in the support height of the electrode disk relative to the diaphragm translates into improved electrode gap spacing stability. Secondly, the benefits of the new geometry provide a stiffer support so that any changes in the applied axial load at the top of the electrode disk result in smaller changes in the support height and subsequently improved electrode gap stability.

Wave spring forces such as those provided by wave spring 40 (of FIG. 1) as shown at 68 in FIG. 2, may vary due to changes in temperature, changes in the wave spring mounting and seating in the sensor cavity which may be induced by mechanical shock and vibration, and also changes in the wave spring cavity height that result from deflection of the Pr cover 26 (shown in FIG. 1) due to barometric pressure changes. The improved structure disclosed herein provides improved dimensional stability and greater axial stiffness of the electrode disk support (housing ring 24 and spacer ring 36 of FIG. 1) and reduces changes in the electrode gap spacing that are due to variations in the force exerted by the wave spring 40.

In the improved sensor, the diaphragm is thus constructed and secured so as to place the diaphragm boundary (at 72 in FIG. 2) more directly under the applied clamping load (shown at 68) in order to make a more direct support as opposed to a cantilevered (indirect) support. This has the effect of increasing the angle between the two sets of loci of points from 45° to an angle within a range of angles that significantly reduce the amount of axial movement between the diaphragm and the electrode disk support (housing ring 24 and spacer ring 36 of FIG. 1). The range of angles that provide the best result are between about 60° up to 90°. The actual choice within this range is a design compromise between maximizing the electrode gap stability versus making an easy to manufacture, high quality stretched diaphragm. One compromise is where the angle α at 82 (FIGS. 2 and 3) is about 75°.

One manufacturing technique for increasing the angle is to make the ring in two parts, one (Pr ring 24) with a reduced diameter near the diaphragm and the other (spacer ring 36) as shown in FIG. 1. The two parts can be secured together by welding or other suitable means. This provides the necessary geometry for the invention and allows for easy assembly of the diaphragm 16 relative to the sensor housing (Pr ring 24 and Px cover 22).

Figure 4:
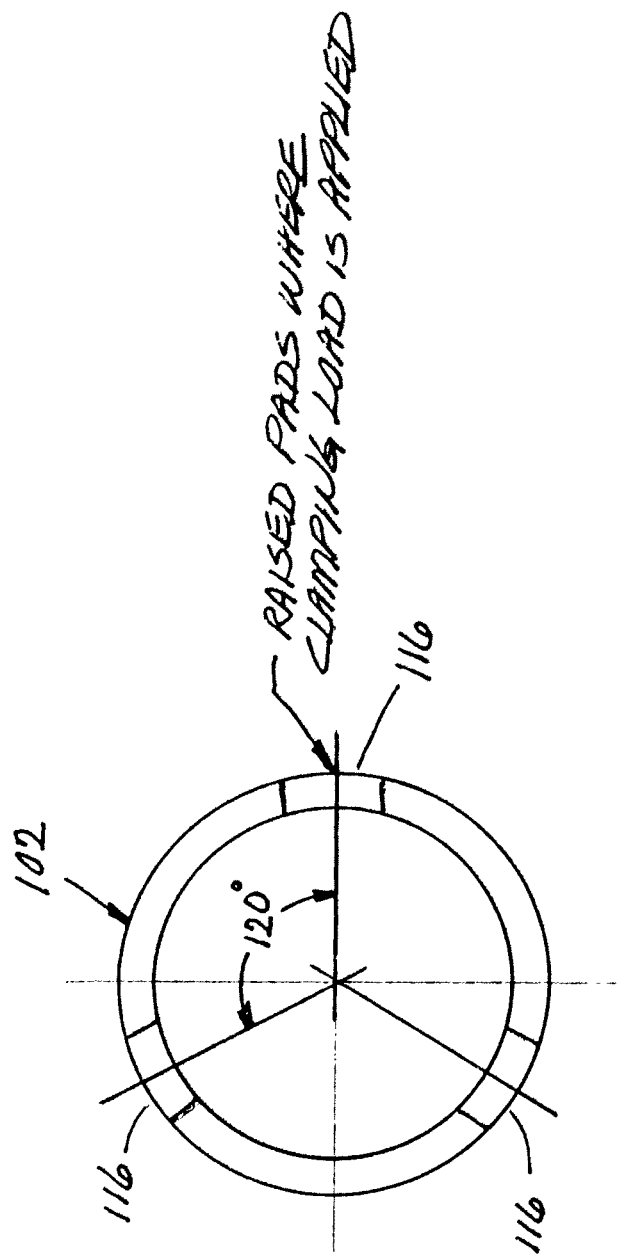
FIG. 4 is a top view of a spacer used in the sensor.
Figure 5:
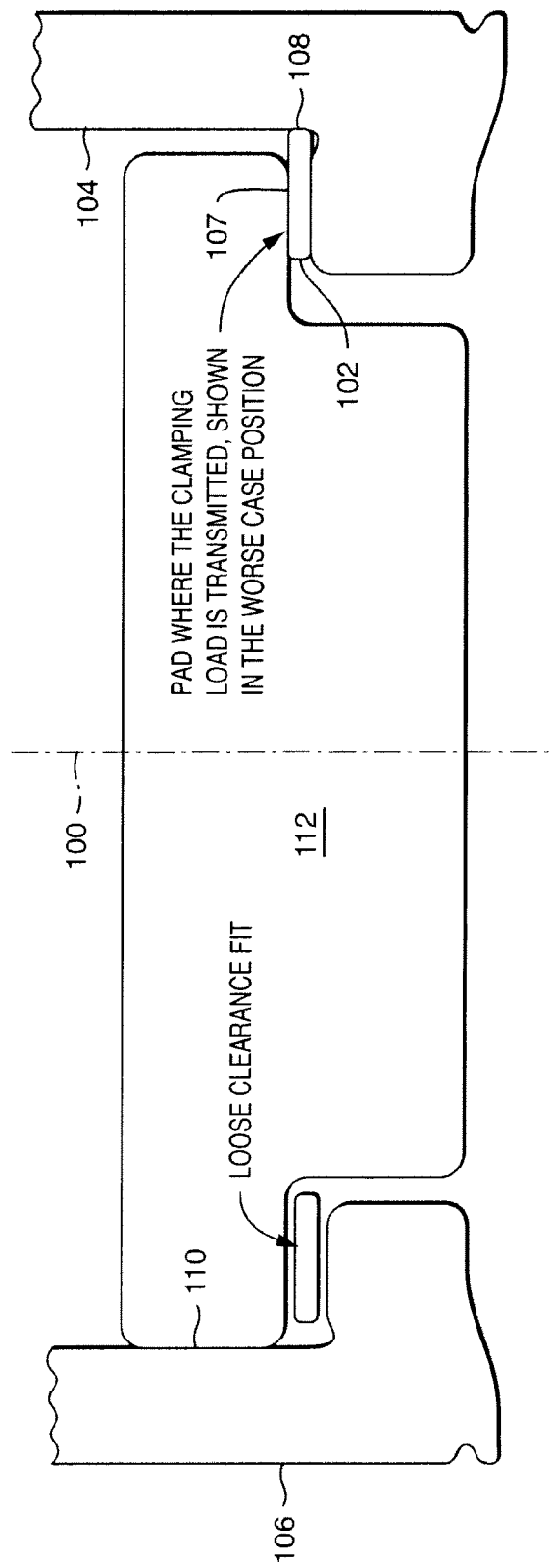
FIG. 5 is a more detailed, axial cross sectional view through a portion of the sensor.

A further improvement relates to a radially compliant spacer. FIGS. 4 and 5 show a prior art approach in which the internal sensor parts are dropped in place and the raised pads (pads 116 in FIG. 4) where the clamping loads are applied 107 are only lined up circumferentially, not radially relative to the central axis 100. A manometer could be assembled under conditions such as shown in FIG. 5, where the spacer 102 is just touching the internal wall 104 of the Pr ring 106 at the location 108, where one of the (3) clamping loads (at the raised pad) are transmitted from the wave spring (not shown). As seen the portion of the electrode structure at location 108 is spaced from the wall 104, while the electrode structure 180° opposite location 108 is touching the internal wall 104 of the Pr ring 106 at location 110.

With this misalignment in the prior art sensor, when temperature drops and the Pr ring 106 shrinks faster and further than the electrode structure 112, since the coefficient of thermal expansion of the Pr ring is greater than that of the electrode disk it induces mechanical strain in the sensor. The differential contraction creates a large, radial shear force at the location of the clamping load 107 (shown on the right side of FIG. 5), and can exceed the frictional clamping force between the electrode structure 112 and the spacer 102, causing the electrode disk to slip to a new position. Upon returning back to the previous temperature in this new altered position the electrode disk 112 experiences a large radial shear force at point 107 that is in the opposite direction. This creates a force couple which distorts the sensor, including the electrode gap and causes a change in the diaphragm tension. These changes have a detrimental effect on the accuracy of the manometer.

Figure 6:
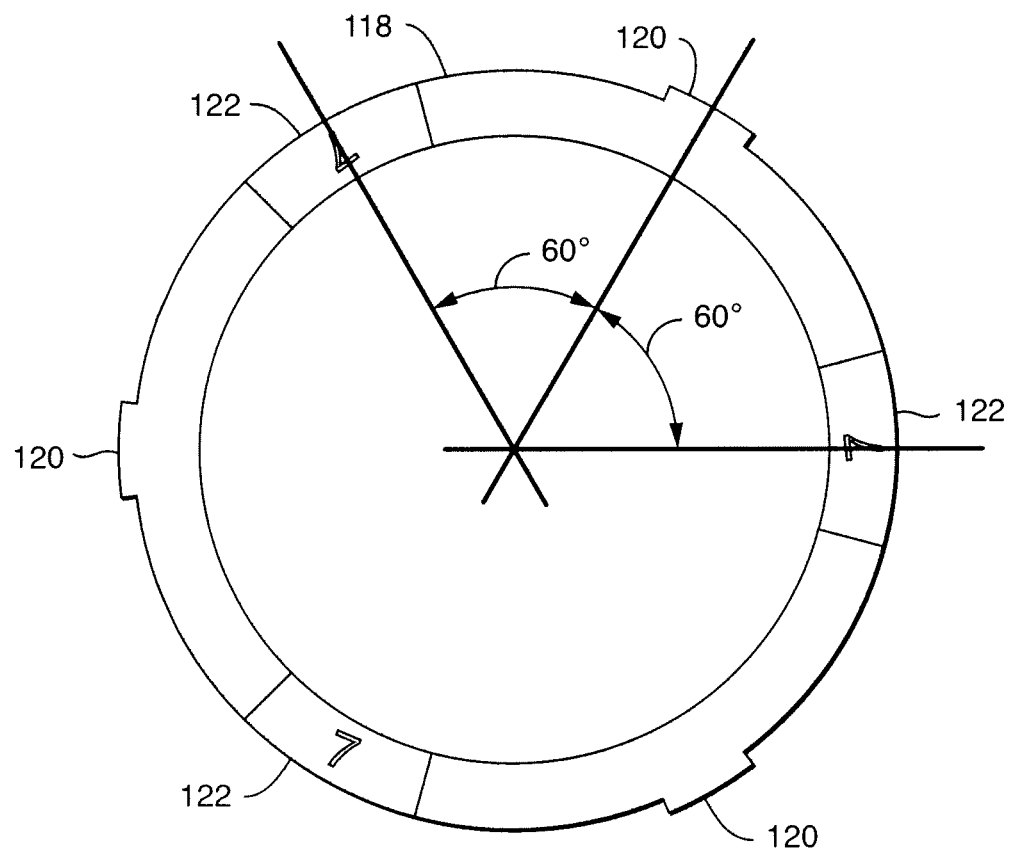
FIG. 6 is a top view of the spacer used in the improvement detailed in FIG. 7.
Figure 7:
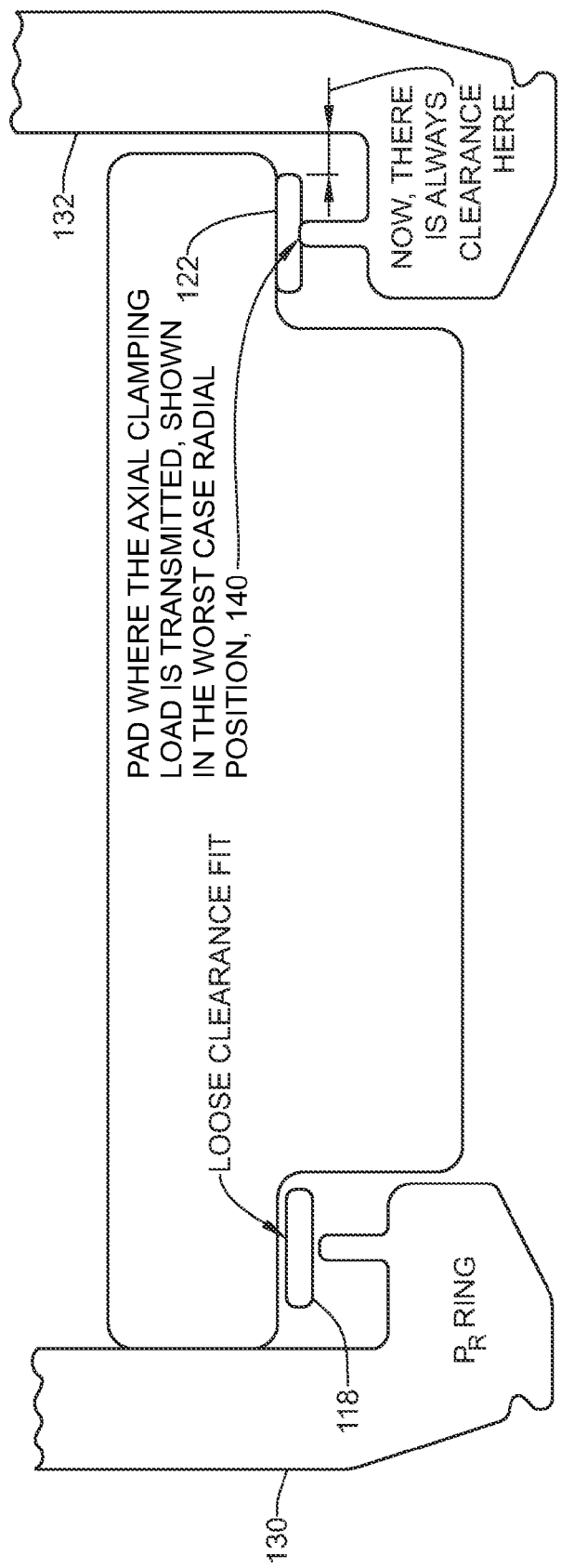
FIG. 7 is a more detailed, cross sectional view of a portion of the embodiment of FIG. 1, showing details of an additional improvement.

The improved sensor described above utilizes a radially compliant spacer ring (118 as shown in FIGS. 6 and 7) which is designed so that only the radial locating tabs 120 may touch the Pr ring bore, and the raised pads (where the clamping loads are applied) 122 always have a radial gap to the Pr ring bore. So, when temperature drops, if a radial locating tab 120 is touching the wall of the Pr ring, then the Pr ring drives the locating tab of the spacer radially inward at a location that is 60° removed from the raised pads which support the electrode disk as shown in the right hand side of the sectional view in FIG. 7. The 60° segments of the thin compliant spacer are flexible and deform relatively easily so that only small lateral forces may be applied to the clamped joint (indicated at 140 at the right side of FIG. 7). This eliminates any possibility of the occasional large force couple distortion of the sensor and subsequent changes in the accuracy of the manometer.

As shown in FIG. 6 the radially compliant spacer 118 includes radial tabs 120 located so that it centers the spacer when disposed in the manometer. Three tabs are shown, angularly spaced 120° apart. The tabs 120 are displaced in between (in the example given, 60°) the locations 122 (three in the example) where the clamping load is applied to the electrode structure.

As shown in FIG. 7, the radially compliant spacer 118 is installed in the Pr ring 130 so that there is always a space between the wall 132 of the Pr ring 130, and pads where the clamping force is applied. The spacer may still occasionally touch the Pr ring wall at the radial locating tabs (60° removed from the sectional view shown in FIG. 7). However, since there is a flexible 60° segment on either side of the locating tab made of thin spacer material that is not clamped and is free to deflect at a lower spring rate, the shear force applied to the electrode disk at the mounting pad is greatly reduced.

Figure 8:
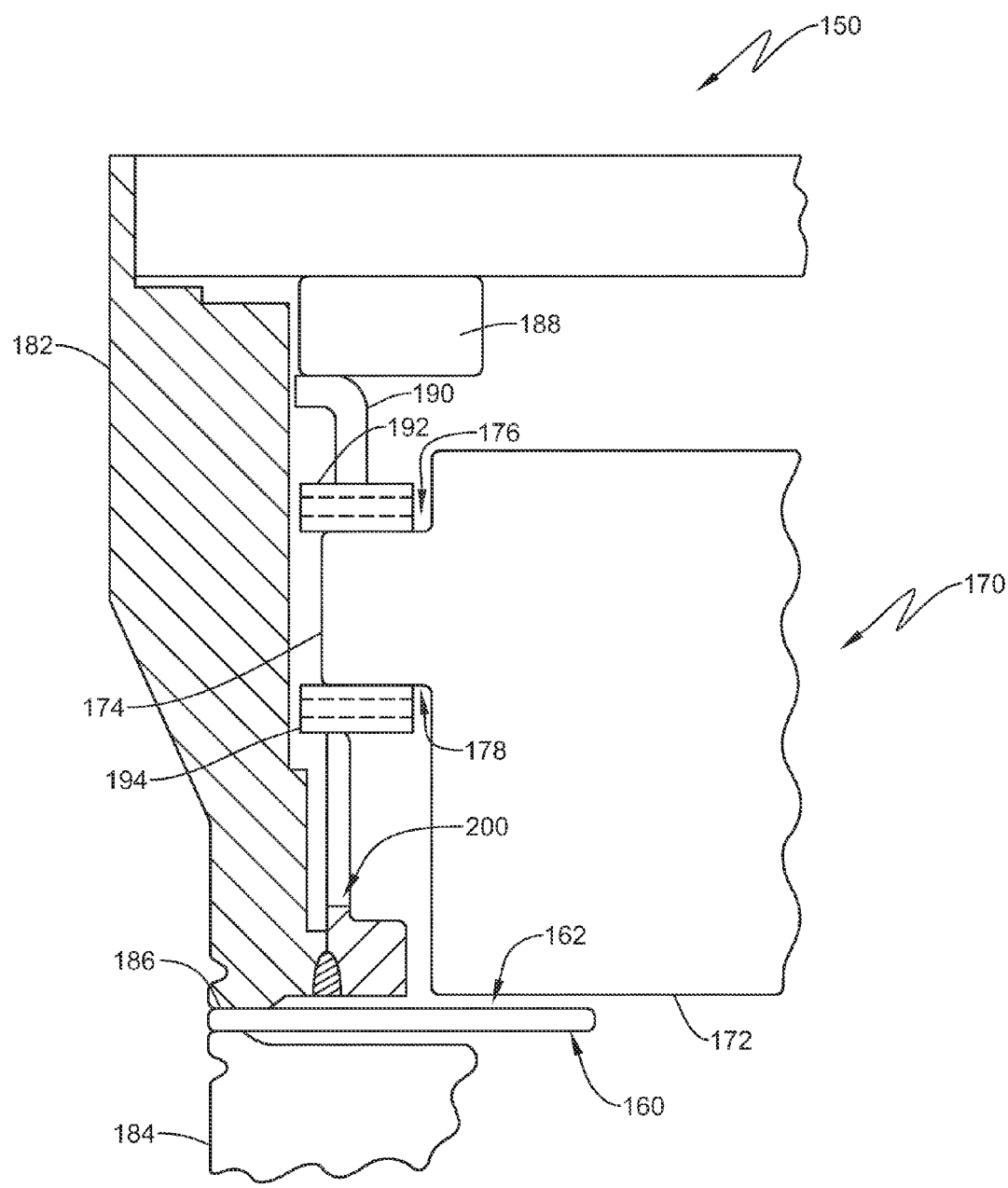
FIG. 8 is an axial cross sectional view, partially cut away, of another embodiment of a capacitive manometer comprising a compliant ring.
Figure 9:
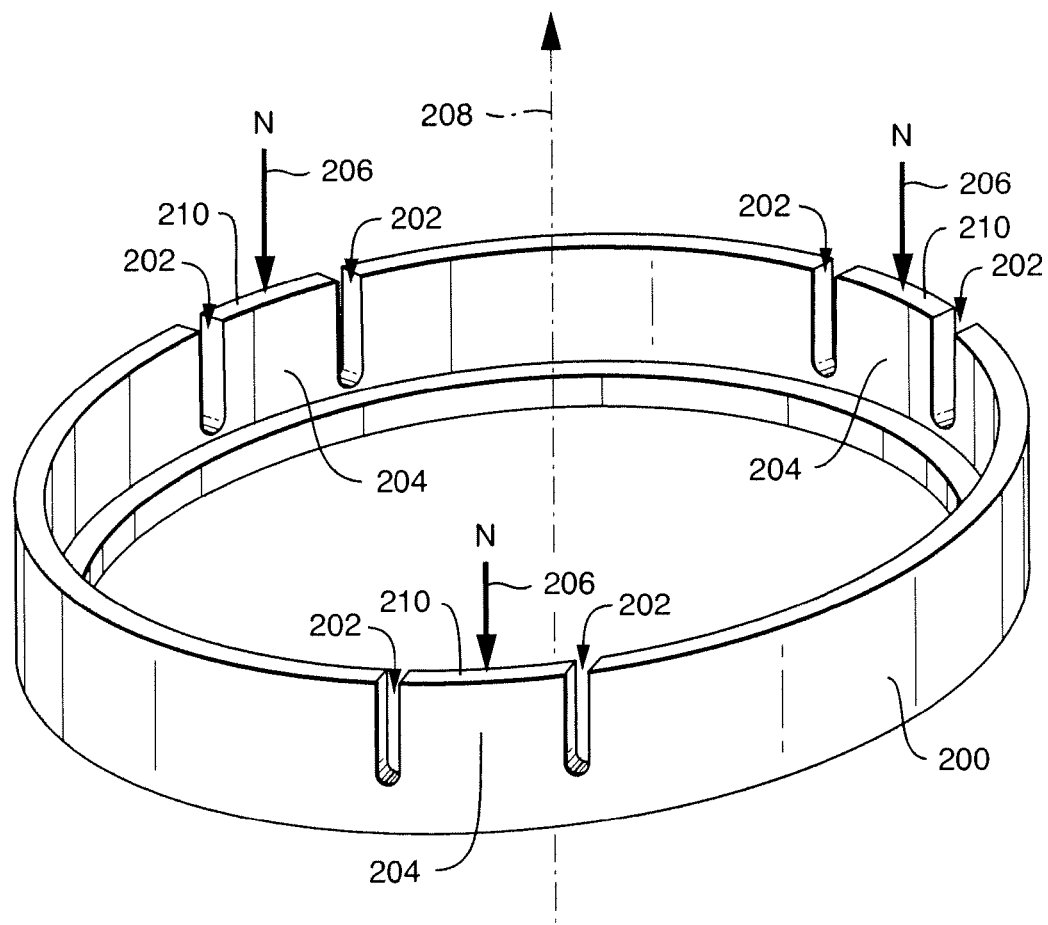
FIG. 9 is a perspective view of the compliant ring of the FIG. 8 embodiment with flexure detail.

Referring to FIGS. 8 and 9, the embodiment shown is a capacitive manometer 150 comprising diaphragm 160. Diaphragm 160 includes a common electrode (not fully shown) provided on one surface 162 of the diaphragm. Manometer 150 also includes electrode support structure 170 supporting a center electrode and ring electrode provided on its surface 172 opposite the surface 162 of the diaphragm provided with the common electrode. The diaphragm 160 is movable relative to the electrode structure between (i) a zero position when the pressure on each side of the diaphragm is the same and (ii) a maximum differential position when the maximum measurable differential pressure is applied to the diaphragm. The electrode support of the embodiment shown in FIG. 8 includes a disk having a lip 174 formed circumferentially around the outer edge of the disk, shown with upper and lower lip surfaces 176 and 178. A diaphragm support structure is arranged so as to support the diaphragm so that the diaphragm is constrained relative to the fixed electrode structure, and the common electrode is spaced from and axially aligned with the center and ring electrodes relative to an alignment axis of the manometer. As shown in the embodiment of FIG. 8, the diaphragm support structure includes $P_R$ ring 182 and a $P_x$ cover 184, wherein the diaphragm 160 is secured around its periphery between these two parts as shown at 186.

The electrode structure 170 is supported within the $P_R$ ring 182 by the electrode support structure including spring 188 (preferably in the form of a wave spring), ring 190, pads 192 and 194, and compliant ring 200. Ring 200 includes axial slots 202 so that at least three flexures 204 are integrally formed in the ring, preferably equiangularly spaced around the ring with respect to an alignment axis 208. The axial slots eliminate the hoop stress in the ring so that the flexures 204 are independent of one another, which allows for a reduction in the radial spring constant at the electrode disk supports without having to further reduce (radial) thickness. This effectively reduces the radial spring constant and maximum possible radial shear loads between the electrode disk and sensor housing while still maintaining a practical usable thickness of this element. The upper and lower lip surfaces 176 and 178 of the lip 174 receive pads 192 and 194 respectfully at each of the locations where the clamping force is received. Specifically wave spring 188 is configured and positioned so as to evenly apply a clamping force 206 through the ring 190 pad 192, lip 174, pad 194 and each flexure 204 of the ring 200. The electrode support 170 is positioned so as to be secured between the two pads, and the compliant ring 200 is secured within ring 182 and preferably is secured thereto by welding or other techniques such as cementing, etc. Thus, the electrode support 170 is clamped in place relative to the diaphragm 160 at the locations of each of the flexures 204.

By designing the compliant ring 200 to operate elastically and providing enhanced radial compliance with reduced radial spring constant, a wider operating window is achieved against thermal and mechanical loading effects on the electrode disk support structure. This accomplishes a reduction in the deformed shape of the electrode structure during system operation so that the precision and stability of the pressure measurement system is enhanced, as well as a reduction of any potential changes to the shape of the electrode structure against environmental factors and thus preserves the calibrated system accuracy.

Further the compliant ring 200 reduces the effects of these environmental factors on the maximum possible shear forces developed between the electrode disk and the sensor housing as the changes in these shear forces and subsequent change in shape of the electrode structure are typically not repeatable (and cannot be compensated) when the shear forces exceed the frictional binding forces between the electrode disk and sensor housing. When the shear forces exceed the frictional binding forces then slip may occur between the lower lip surface 178 of the electrode disk 170 and the support face 210 of the compliant ring 200 which is secured so as to be fixed relative to the sensor housing and diaphragm.

As constructed in FIGS. 8 and 9, the maximum possible shear loads between the electrode disk 170 and the sensor housing including ring 182, as well as reduction in any shifts in the sensor output related to these effects is accomplished so that there is a reduction in the magnitude of any mechanical hysteresis due to these non-conservative effects. The maximum possible changes to the shape of the electrode structure are reduced, allowing improved preservation of system accuracy for the lowest pressure ranges having the smallest electrode gaps.

The potential changes in shape of the electrode structure and diaphragm include bending of the electrode disk 170, transverse Poisson contraction of the electrode disk 170, changes in the position of the diaphragm boundary 186 in the vicinity of the electrode supports with subsequent changes in the shape (and tension) of the diaphragm 160 from zero differential pressure to any pressure within the operating pressure range of the instrument.

It should be evident that various changes can be made to the embodiments described without departing from the scope of the claims. For example, while the embodiment described utilizes a dual electrode with a guard, other electrode configurations are possible, including a single electrode structure, and a multiple electrode structure with more than two electrodes. The embodiment shown is illustrative and any number of conductors and conductor patterns may be on the electrode disk. Further the electrical guard and extra conductors can be maintained at signal ground, or at some other fixed potential. Further the guard can be actively driven. If actively driven, it is preferable that the guard voltage and phase match the instantaneous voltage and phase of the physically adjacent electrode.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

Nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

What is claimed is:

1. A capacitive manometer comprising:
   (a) a diaphragm including a common electrode and (b) an electrode structure including a center electrode and ring electrode, wherein the diaphragm is movable relative to the electrode structure between (i) a zero position when the pressure on each side of the diaphragm is the same and (ii) a maximum differential position when the maximum measurable differential pressure is applied to the diaphragm, and
   a diaphragm support structure arranged so as to support the diaphragm so that the diaphragm is constrained relative to the electrode structure, and the common electrode is spaced from and axially aligned with the center and ring electrodes relative to an alignment axis of the manometer; and
   an electrode support structure arranged to support the electrode structure and comprising a compliant ring including at least three flexures integrally formed in the ring and angularly spaced around the alignment axis;
   wherein the electrode support is clamped in place relative to the diaphragm at the locations of the compliant ring flexures.

2. A capacitive manometer according to claim 1, wherein the flexures are equiangularly spaced around the compliant ring.

3. A capacitive manometer according to claim 2, wherein the ring includes slots formed in the ring so as to form the flexures between adjacent pairs of slots.

4. A capacitive manometer according to claim 3, wherein the slots are formed in the axial direction of the spring, and are of equal length.

5. A capacitive manometer according to claim 1, wherein the electrode support structure includes a spring configured to apply an axial force on the ring at the location of each of the flexures.

6. A capacitive manometer according to claim 5, wherein the spring is a wave spring.

7. A capacitive manometer according to claim 6, wherein the wave spring is configured to apply axial force through the electrode structure at the locations of each of the flexures.

8. A capacitive manometer according to claim 7, wherein the electrode support structure further includes a pair of support pads for supporting the electrode structure within the electrode support structure, wherein the wave spring applies axial force through the support pads and the electrode structure at the locations of each of the flexures.

9. A capacitive manometer according to claim 6, wherein the electrode support structure includes a support substrate arranged so as to support the ring and center electrodes.

* * * * *